United States Patent
Ochiai et al.

(10) Patent No.: US 6,513,610 B2
(45) Date of Patent: Feb. 4, 2003

(54) SHIFT CONTROL SYSTEM FOR CONTINUOUSLY VARIABLE TRANSMISSION

(75) Inventors: Tatsuo Ochiai, Fuji (JP); Akira Hino, Fuji (JP)

(73) Assignee: Jatco Transtechnology Ltd. (JP)

( * ) Notice: Subject to any disclaimer, the term of this patent is extended or adjusted under 35 U.S.C. 154(b) by 0 days.

(21) Appl. No.: 09/921,273

(22) Filed: Aug. 2, 2001

(65) Prior Publication Data
US 2002/0017413 A1 Feb. 14, 2002

(30) Foreign Application Priority Data
Aug. 2, 2000 (JP) ........................................ 2000-234248

(51) Int. Cl.⁷ ............................................... B60K 31/10
(52) U.S. Cl. ........................... 180/176; 701/95; 474/28; 474/70; 477/44
(58) Field of Search ................................ 180/170, 171, 180/172, 173, 174, 175, 176, 177, 178, 179, 167, 168, 169; 701/93, 95, 96; 474/18, 28, 69, 70; 477/43, 44; 340/903; 342/69, 70

(56) References Cited

U.S. PATENT DOCUMENTS

| | | | |
|---|---|---|---|
| 6,182,000 B1 * | 1/2001 | Ohta et al. ................. | 701/55 |
| 6,205,387 B1 * | 3/2001 | Ochiai ......................... | 701/51 |
| 6,223,118 B1 * | 4/2001 | Kobayashi et al. ........... | 701/96 |
| 6,311,118 B1 * | 10/2001 | Ito et al. ..................... | 701/95 |
| 6,330,507 B1 * | 12/2001 | Adachi et al. ............... | 701/96 |
| 6,370,470 B1 * | 4/2002 | Yamamura et al. .......... | 701/96 |

FOREIGN PATENT DOCUMENTS

JP          6469849          *  3/1989

* cited by examiner

Primary Examiner—Brian L. Johnson
Assistant Examiner—Bryan Fischmann
(74) Attorney, Agent, or Firm—Rossi & Associates (57) ABSTRACT

A shift control system for a continuously variable transmission CVT) has a gear ratio controller for controlling the gear ratio of CVT by determining a target gear ratio from a drive point determined on the basis of at least a throttle opening and a vehicle speed. The shift control system also has a vehicle distance controller for maintaining a proper vehicle distance by controlling the throttle opening of an engine. A shift speed control device provided in the gear ratio controller increases the shift speed from the shift speed established at the time the vehicle distance is not controlled by the vehicle distance controller, when the vehicle distance is controlled by the vehicle distance controller.

5 Claims, 7 Drawing Sheets

SHIFT CONTROL SYSTEM FOR CONTINUOUSLY VARIABLE TRANSMISSION

BACKGROUND OF THE INVENTION

1. Field of the Invention

The present invention relates to a shift control system for a continuously variable transmission having a so-called cruise control system which controls a gear ratio of the continuously variable transmission and thereby maintains a vehicle speed or an inter-vehicle distance in a constant level by means of a vehicle distance control device or a vehicle speed control device.

2. Description of the Prior Art

Japanese Patent Application Laid-open No. 9-202155 discloses a control system of an automatic transmission for a vehicle equipped with a constant speed running control device maintaining the vehicle speed in a constant level. As disclosed, the vehicle distance detecting means detects an inter-vehicle distance(hereinafter referred to as vehicle distance) and then determines a vehicle distance a little longer than a distance where an ordinary driver may start deceleration. When this longer distance is equal to the detected vehicle distance, throttle opening and gear ratio are controlled harmoniously with each other, and thereby a drive point is changed and a sufficient deceleration can be achieved:

However, since the follow-up performance in shifting of the transmission cannot be ensured when the aforementioned conventional constant speed running control device controls a vehicle distance, the vehicle distance may not be kept proper. Particularly, if another vehicle suddenly interposes between the driver's own vehicle and the preceding vehicle when the driver runs the vehicle while maintaining a proper vehicle distance from the preceding vehicle, the vehicle distance shortens rapidly, and therefore an especially quick follow-up performance in shifting is demanded.

SUMMARY OF THE INVENTION

The present invention has been made in view of the aforementioned problem, and its object is to provide a shift control system of a continuously variable transmission which has a vehicle distance control device for controlling a vehicle distance from a preceding vehicle and capable of sufficiently attaining a follow-up performance for maintaining a vehicle distance properly.

To realize the aforementioned object, according to an aspect of the invention, there is provided a shift control system for a continuously variable transmission which has a gear ratio control means for controlling gear ratio of said continuously variable transmission by determining a target gear ratio from a drive point determined on the basis of at least a throttle opening and a vehicle speed, and a vehicle distance control means for maintaining a proper vehicle distance by controlling a throttle opening of an engine, wherein said gear ratio control means includes a shift speed control device for making a shift speed higher than a shift speed established at the time when a vehicle distance is not controlled, when a vehicle distance is controlled by said vehicle control means. Shift speed is the rate at which the gear ratio of the transmission is changed.

The shift speed control device controls a shift speed, i.e., the rate at which the gear ratio is changed, at a higher speed when a vehicle distance is controlled. Thus, the gear ratio can be changed with good response to a shift command issued from the shift control means, and the vehicle distance can be kept proper.

In the preferred embodiment, the shift speed control device is provided with a first shin speed map for setting a shift speed according to a deviation between a target gear ratio and an actual gear ratio when a vehicle distance is not controlled and a second shift speed map for setting a shift speed which is constant and higher than a shift speed at the time when a vehicle distance is not controlled, regardless of a deviation between a target gear ratio and an actual gear ratio, when a vehicle distance is controlled.

Since shift speed is set according to a deviation between a target gear ratio and an actual gear ratio when a vehicle distance is not controlled, a smooth shift control can be performed. In addition, by always increasing the shift speed regardless of the deviation between a target gear ratio and an actual gear ratio when an excellent response is demanded as at the time of controlling a vehicle distance, a sufficient shift response can be ensured and a vehicle distance can be kept proper.

Preferably, the shift speed control device is equipped with a line pressure-correcting device for adding a correction line pressure to a line pressure for an ordinary control when performing a gear ratio control for increasing a shift speed.

In a belt-type continuously variable transmission, for example, when the shift speed control device increases shift speed, a pulley ratio must be quickly changed by supplying a high line pressure to a pulley. Therefore, by adding the correction line pressure to the line pressure for a ordinary control, a sufficient line pressure can be ensured, and the pulley ratio can be changed with good response even if the shift speed is increased.

Further preferably, the shift speed control device is equipped with a shift speed limiter for setting an upper limit of a shift speed at the time of obtaining a deceleration torque by changing a gear ratio to a lower level (side) when the vehicle distance is controlled.

When demand for deceleration torque is generated at the time of controlling the vehicle distance, the deceleration is attempted by closing the throttle opening and thereby shifting gear ratio to a lower level. However, the shift speed control device selects a high shift speed regardless of a deviation between a target gear ratio and an actual gear ratio. In this case, if a gear ratio is shifted to a lower level rapidly and an engine speed becomes less than a revolution speed of a driving wheel, the slow engine speed, i.e., engine braking, can lock the driving wheel. Therefore, by providing the shift speed limiter to prevent excessive engine braking, a smooth deceleration can be performed.

Still further preferably, the gear ratio control means is provided with a target shift map for a vehicle distance control for determining a target gear ratio so that a gear ratio is set to a higher level when the vehicle distance control means controls a vehicle distance, compared to the time when the vehicle distance control means does not control a vehicle distance.

Therefore, since an excessive acceleration/deceleration is not performed at the time of changing speed compared to an ordinary running, a stable running state can be maintained, and thus the driver can enjoy a vehicle distance control without feeling physical discomfort.

BRIEF DESCRIPTION OF THE DRAWINGS

The nature of this invention, as well as other objects and advantages thereof, will be explained in the following with reference to the accompanying drawings, wherein.

DETAILED DESCRIPTION OF THE PREFERRED EMBODIMENT

Here will be described the embodiment of the invention with reference to the accompanying drawings.

Figure 1:
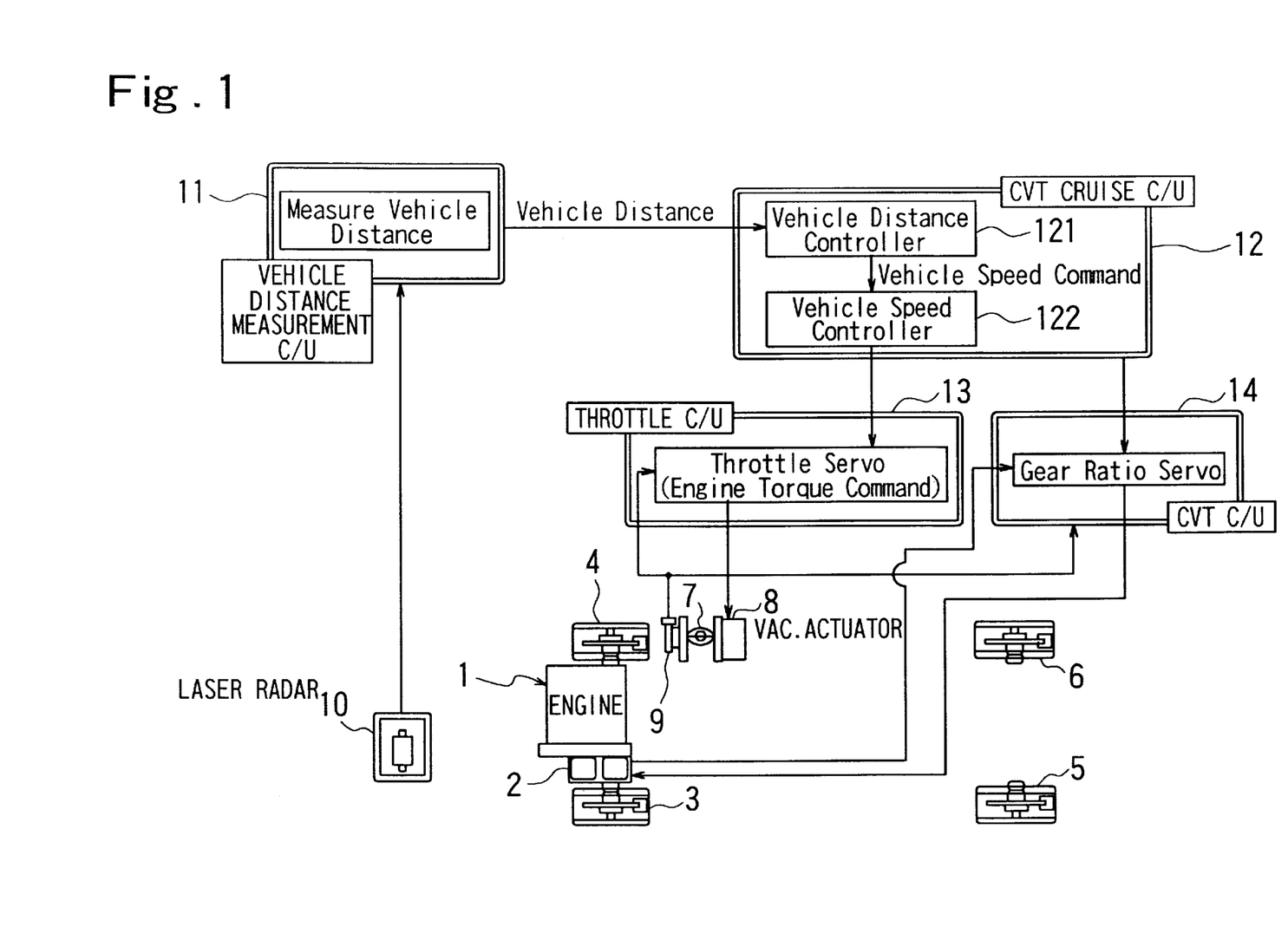
FIG. 1 is a block diagram showing a CVT cruise system to which a shift control system according to an embodiment of the invention is applied.

FIG. 1 is a block diagram of a CVT cruise system to which a shift control system according to the embodiment of the invention is applied.

As shown in FIG. 1, a throttle valve 7 of an engine 1 has a vacuum actuator 8 for controlling a valve opening on the basis of an external command, and a throttle opening sensor 9 for detecting a valve opening of the throttle valve 7. In FIG. 1 there are also shown a left front wheel 3, a right front wheel 4, a left rear wheel 5 and a right rear wheel 6.

A laser radar 10 is mounted in the front position of a vehicle and outputs radar data for measuring a vehicle distance to a preceding vehicle.

A vehicle distance measurement control unit 11 measures a vehicle distance to the preceding vehicle on the basis of the radar data from the laser radar 10.

A CVT cruise control unit 12 serves to run the vehicle at a set vehicle speed while maintaining a vehicle distance to the preceding vehicle in a constant range. This CVT cruise control unit 12 includes a vehicle distance controller 121 for calculating a vehicle speed command value on the basis of data on a vehicle distance and a vehicle speed controller 122 for calculating a target engine torque on the basis of a vehicle speed command value from the vehicle distance controller 121.

A throttle control unit 13 controls the vacuum actuator 8 so that a throttle opening corresponding to an engine torque command value can be obtained. And the throttle control unit 13 receives a target engine torque signal from the vehicle speed controller 122 and determines an engine torque command value on the basis of the target engine torque signal, and outputs the engine torque command value to the vacuum actuator 8. In addition, this throttle control unit 13 constitutes a servo system performing a feedback control so that an actual throttle opening of the throttle valve 7 coincides with the engine torque command value.

A CVT control unit 14 controls a gear ratio of a blet-type continuously variable transmission (CVT) 2 to achieve a target gear ratio. The CVT control unit 14 determines a target gear ratio on the basis of a CVT cruise set command from the CVT cruise control unit 12 and outputs a command of achieving the target gear ratio to a hydraulic pressure control valve unit 15 (see FIG. 2) acting as a speed change actuator. This CVT control unit 14 constitutes a servo system performing a feedback control so that an actual gear ratio coincides with a target gear ratio.

Figure 2:
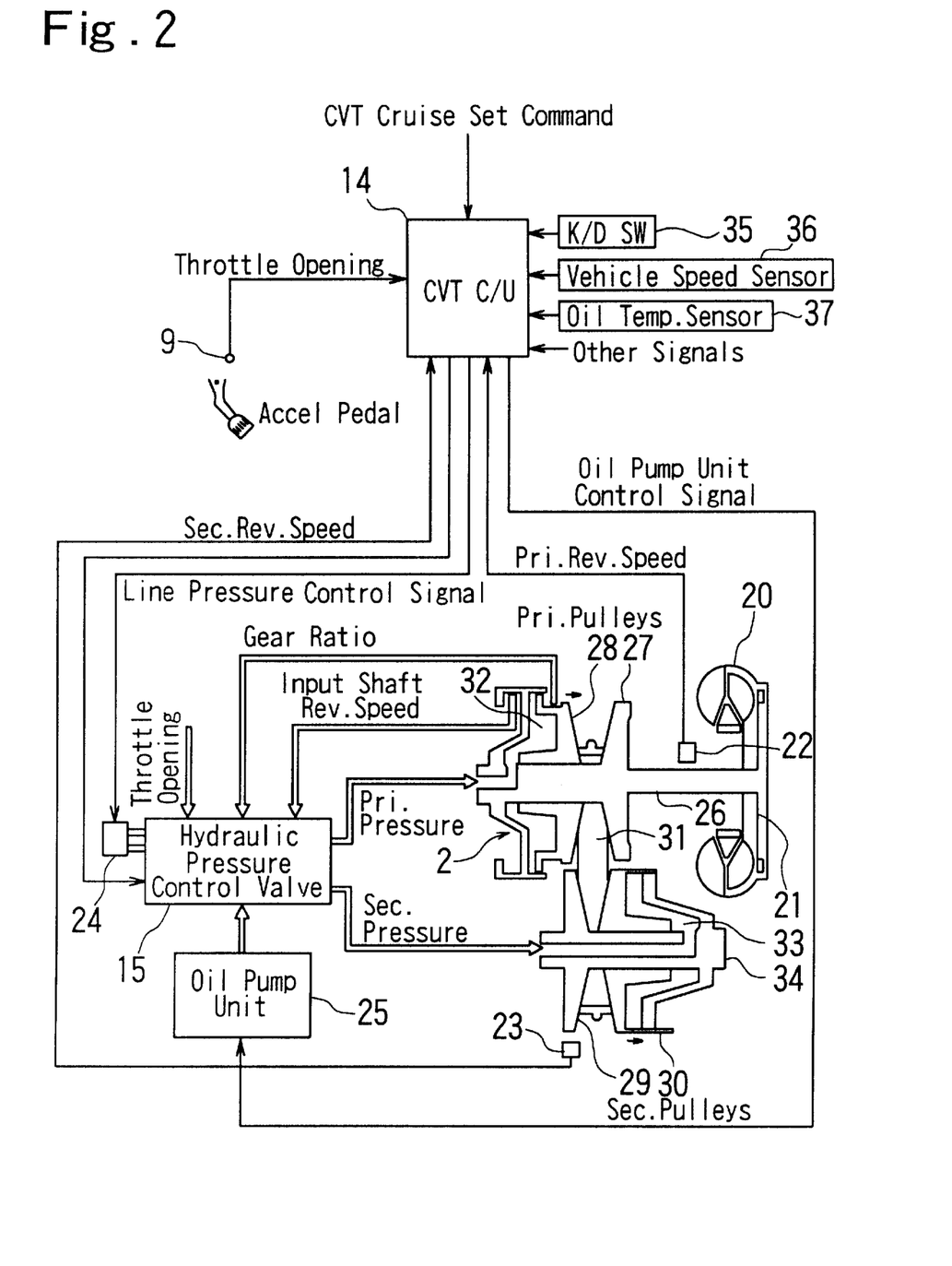
FIG. 2 is a diagram showing a belt-type continuously variable transmission and a shift control system according to an embodiment of the invention.

FIG. 2 is a diagram showing a belt-type continuously variable transmission and a shift control system according to the embodiment.

To an output shaft of the engine 1 shown in FIG. 1, there is coupled a torque converter 20 which includes a lock-up clutch 21 connecting the engine 1 and the belt-type CVT 2 directly.

The output shaft side of the torque converter 20 is coupled to a transmission input shaft 26. One end of this input shaft 26 is provided with primary pulleys 27, 28 of the belt-type CVT 2.

The belt-type CVT 2 is comprised of the aforementioned primary pulleys 27, 28, secondary pulleys 29, 30 and a belt 31 transmitting torque of the primary pulleys 27, 28 to the secondary pulleys 29, 30. Of the primary pulleys 27, 28, a movable primary pulley 28 can be moved in the axial direction of the input shaft 26 by primary hydraulic pressure (pri. pressure) acting on a primary pulley cylinder chamber 32. Of the secondary pulleys 29, 30, a movable secondary pulley 30 can be moved in the axial direction of an output shaft 34 by secondary hydraulic pressure(sec. pressure) acting on a secondary pulley cylinder chamber 33. To the output shaft 34, there is firmly fitted a not-shown drive gear which drives a drive shaft extending to wheels via a pinion mounted on an idler shaft, a final gear and a differential gear unit.

By moving the movable primary pulley 28 and the movable secondary pulley 30 in their respective axial directions and changing radii of these pulleys coming into contact with the belt 31, a revolution speed ratio of the primary pulleys 27, 28 to the secondary pulleys 29, 30 (inverse of pulley ratio), that is, a gear ratio can be changed.

The control for changing the width of V-shaped pulley grooves of these primary pulleys 27, 28 and secondary pulleys 29, 30 is performed by supplying primary hydraulic pressure and secondary hydraulic pressure, which are produced by the hydraulic pressure control valve unit 15 in accordance with command from the CVT control unit 14, to the primary pulley cylinder chamber 32 and the second pulley cylinder chamber 33 respectively.

The CVT control unit 14 receives a CVT cruise set command from the CVT cruise control unit 12. This CVT control unit 14 receives a throttle opening signal from a throttle opening sensor 9, a switch signal from a kick-down switch 35, a vehicle speed signal from a vehicle speed sensor 36, a transmission oil temperature signal from an oil temperature sensor 37, a primary revolution speed signal from a primary speed sensor 22, a secondary revolution speed signal from a secondary speed sensor 23 and other signals. The CVT control unit 14 performs arithmetic processing on the basis of these input signals and outputs a line pressure control signal to a line pressure solenoid 24 and outputs a gear ratio control signal to the hydraulic pressure control valve 15 and outputs an oil pump unit control signal to an oil pump unit 25.

Figure 3:
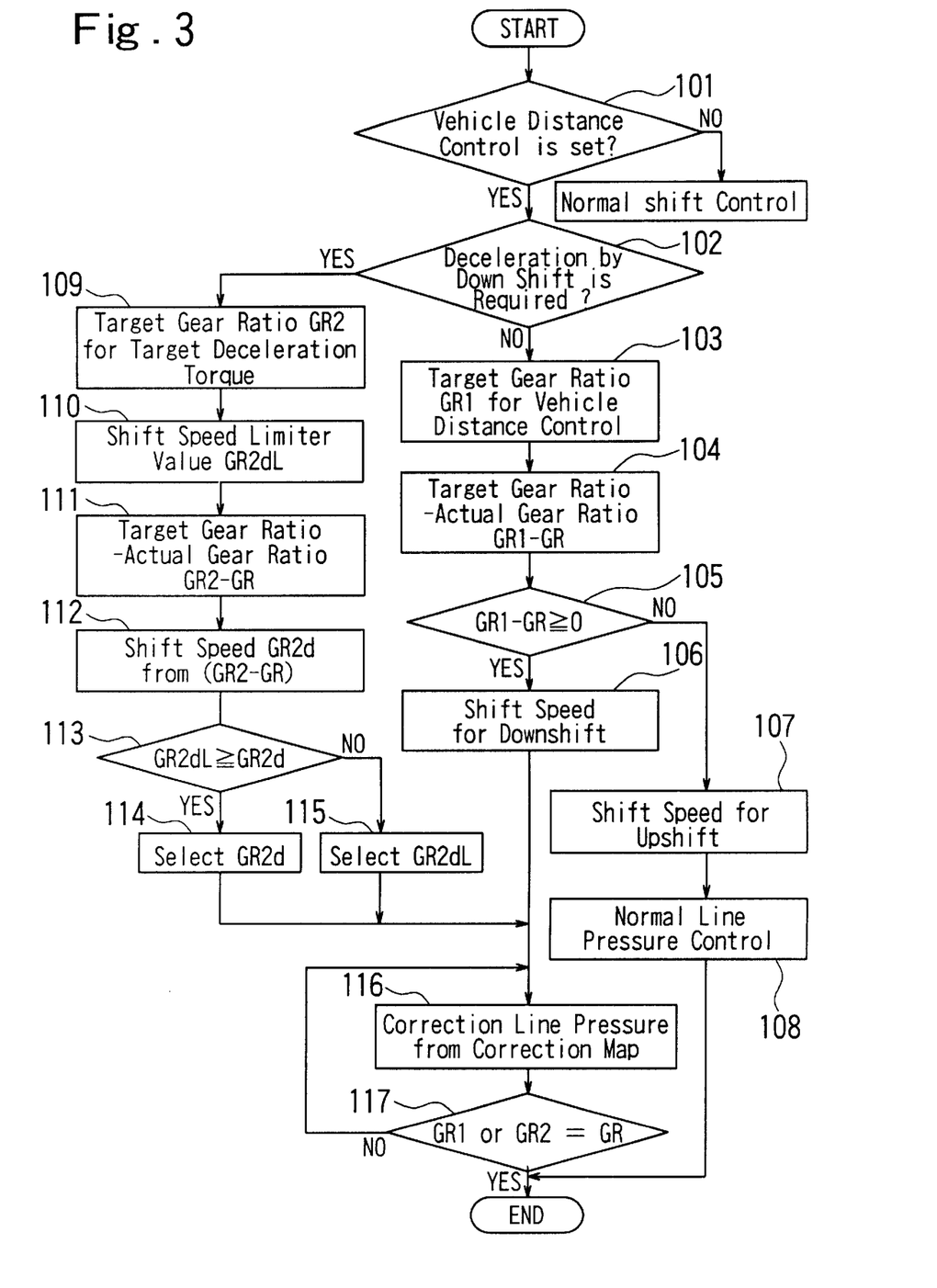
FIG. 3 is a flow chart showing a shift control according to an embodiment of the invention.

FIG. 3 is a flow chart showing a shift control in the CVT control unit 14 according to the embodiment.

Figure 4:
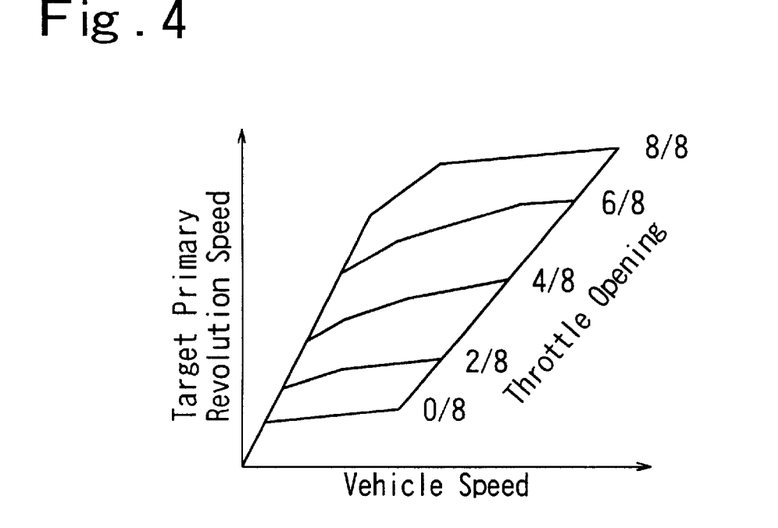
FIG. 4 illustrates a shift map for the time when a vehicle distance is not controlled according to an embodiment of the invention.

At step 101, it is determined whether a vehicle distance control is set by the CVT cruise control unit 12. If the result at the step 101 is affirmative, the routine is advanced to step 102. If the result at step 101 is negative, the routine is advanced to a normal shift control in which a target gear ratio is calculated using a target shift map as shown in FIG. 4.

At the step 102, it is determined whether deceleration by downshifting is required based on an acceleration/deceleration signal from the vehicle distance controller 121. If the result at the step 102 is affirmative, the routine is advanced to step 109. If the result at the step 102 is negative, the routine is advanced to step 103.

Figure 5:
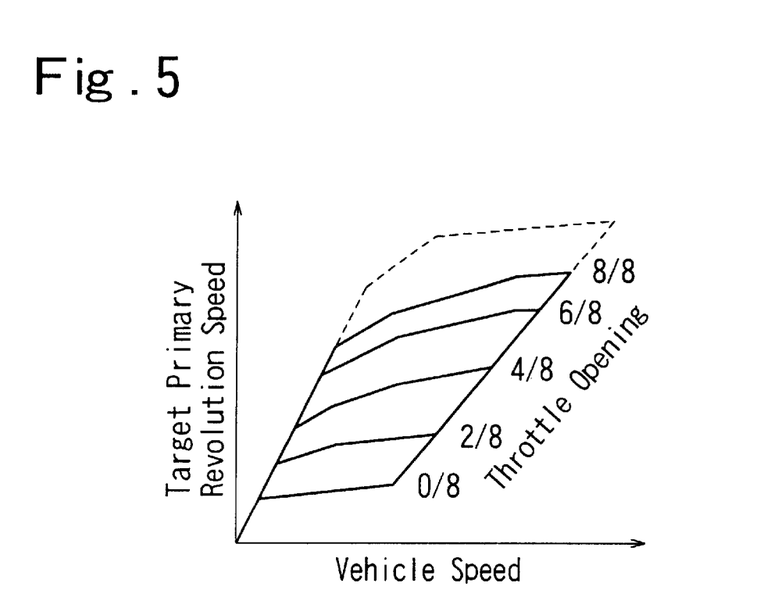
FIG. 5 illustrates a shift map for the time when a vehicle distance is controlled according to an embodiment of the invention.

At the step 103, a target gear ratio GR1 is calculated using a target shift map for a vehicle distance control as shown in FIG. 5.

Since the secondary pulleys 29, 30 are provided to the output shaft 34 which is connected to the wheels, a revolution speed of the secondary pulleys 29, 30 is proportional to a vehicle speed. Therefore, in the CVT control unit 14 the target gear ratio is calculated based on the primary revolution speed (revolution speed of the primary pulleys) obtained from the target shift map.

At step 104, there is calculated a deviation GR1−GR between a target gear ratio GR1 and an actual gear ratio GR.

At step 105, it is determined whether the deviation GR1−GR is equal to or more than 0. If the deviation GR1−GR is equal to or more than 0, it is determined that downshift is required, and the routine is advanced to step 106. If the deviation GR1−GR is less than 0, it is determined that upshift is required, and the routine is advanced to step 107.

At the step 106, a shift speed is calculated from a shift speed map for downshift.

At the step 107, a shift speed is calculated from a shift speed map for upshift.

At step 108, a normal line pressure control is performed.

At the step 109, a target gear ratio GR2 corresponding to a target deceleration torque is calculated.

At step 110, a shift speed limiter value GR2dL is calculated.

At step 111, a deviation GR2−2GR between a target gear ratio GR2 and an actual gear ratio GR is calculated.

At step 112, by using the deviation GR2−GR, a shift speed GR2d is calculated from the shift speed map for downshift.

At step 113, it is determined whether the shift speed limiter value GR2dL is equal to or more than a shift speed GR2d. If the result is GR2dL≧GR2d, the routine is advanced to step 114. If the result is GR2dL<GR2d, the routine is advanced to step 115.

At the step 114, GR2d is selected as a shift speed.

At the step 115, GR2dL is selected as a shift speed.

At step 116, a correction line pressure is calculated from a line pressure correction map and added to an ordinary line pressure.

At step 117, it is determined whether a target gear ratio GR1 or GR2 coincides with an actual gear ratio GR. If the result is affirmative, this control is terminated. If the result is negative, the routine returns to the step 116, and the correction line pressure is added.

When a CVT cruise set command is outputted from the CVT cruise control unit 12, a vehicle distance control for maintaining a vehicle distance is started. Then, an acceleration/deceleration is performed depending on a vehicle distance to a preceding vehicle. For example, when the driver runs his own vehicle, maintaining a proper vehicle distance to a preceding vehicle, if another vehicle cuts in between the driver's own vehicle and the preceding vehicle or the preceding vehicle decelerates rapidly, deceleration by downshifting accompanied by engine braking is required. Here, first it is determined whether deceleration by downshifting is required. If the result is negative, a target gear ratio GR1 is calculated using the shift map for a vehicle distance control as shown in FIG. 5, and a shift speed is calculated based on a deviation from the actual gear ratio GR.

Figure 6:
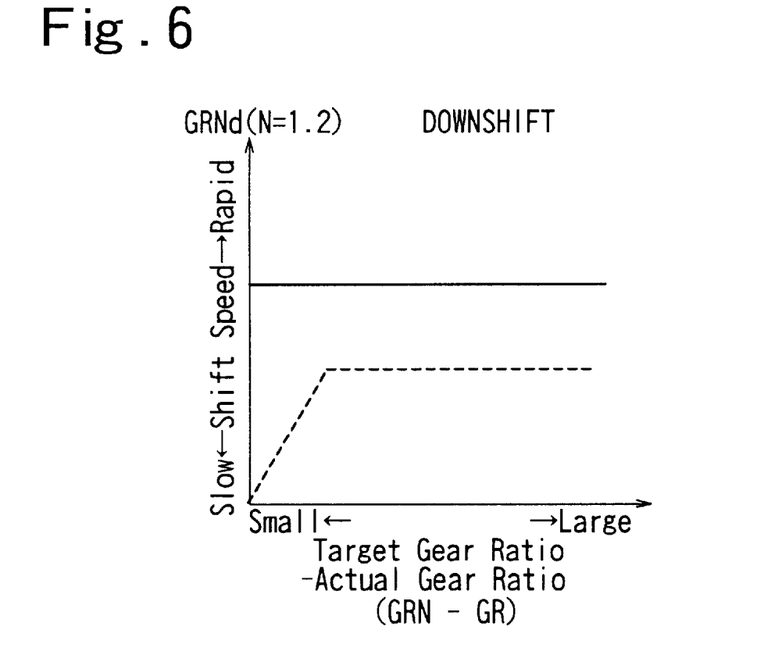
FIG. 6 illustrates a shift speed map for downshift according to an embodiment of the invention.
Figure 10:
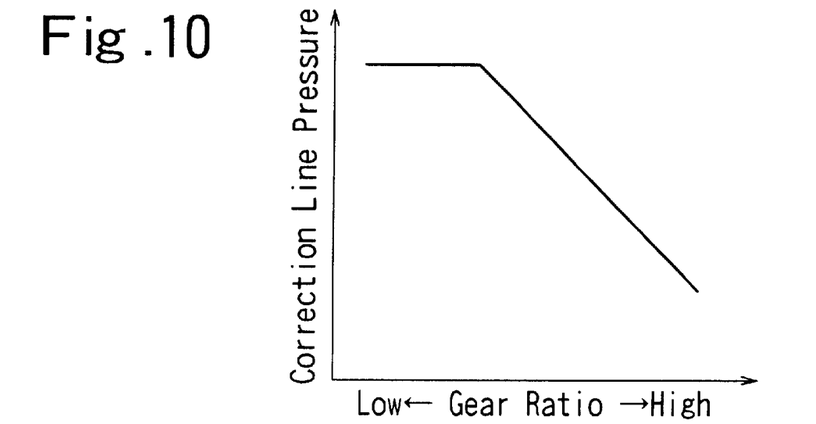
FIG. 10 illustrates a correction line pressure map for downshift according to an embodiment of the invention.

In this case, if the deviation GR1−GR between a target gear ratio and an actual gear ratio is equal to or more than 0, it is determined that downshift is required because the target gear ratio is high, and a shift speed is calculated using the shift speed map for downshift shown in FIG. 6, and at the same time a correction line pressure shown in FIG. 10 is added to an ordinary line pressure. Since the belt-type CVT of the embodiment changes pulley pressure by using line pressure, by adding a correction line pressure to an ordinary line pressure, a target gear ratio can be achieved with good response even if a shift speed is increased.

Figure 7:
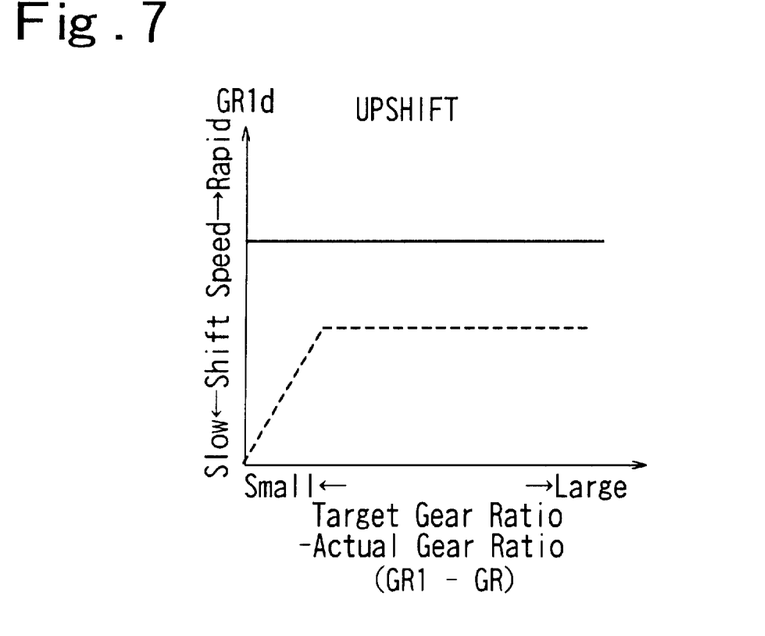
FIG. 7 illustrates a shift speed map for upshift according to an embodiment of the invention.

If a deviation GR1−GR between a target gear ratio and an actual gear ratio is less than 0, it is determined that upshift is required because a target gear ratio is low, and a shift speed is calculated using the shift speed map for upshift shown in FIG. 7. In this case, since a gear ratio is changed by decreasing pulley pressure during upshift differently from the time of downshift, the addition of a correction line pressure is not required, and thus an ordinary line pressure control is performed.

Figure 8:
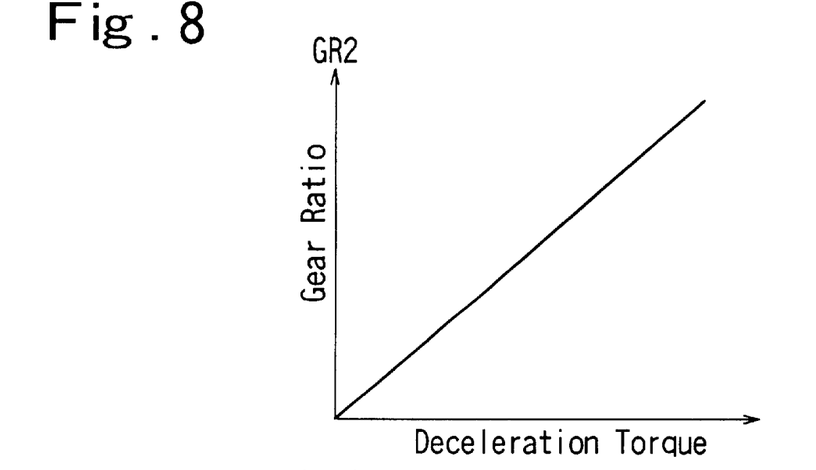
FIG. 8 illustrates a gear ratio map for the time when a deceleration torque is required according to an embodiment of the invention.
Figure 9:
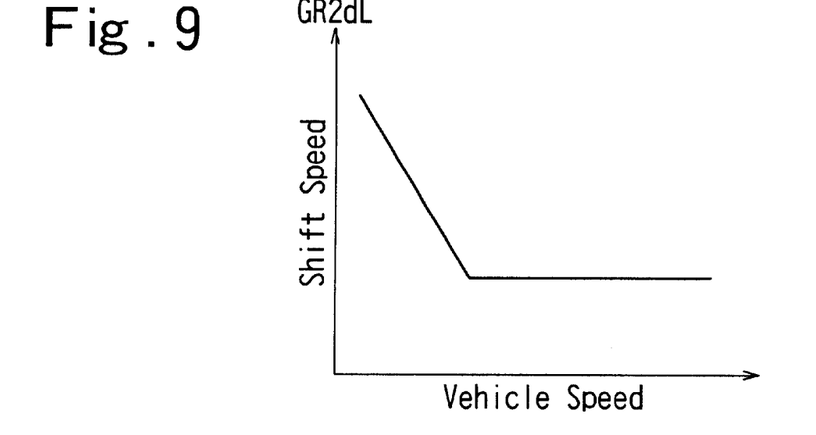
FIG. 9 illustrates a shift speed limiter map for downshift according to an embodiment of the invention.

Next, when it is determined that deceleration by downshifting is required due to the cut-in of a vehicle or a rapid deceleration of a preceding vehicle, as described before, a target gear ratio GR2 corresponding to a target deceleration torque is calculated from a map shown in FIG. 8. Then, a shift speed limiter value GR2dL is calculated from a map shown in FIG. 9. The calculation of this speed limiter value GR2dL is made to prevent the occurrence of a problem that a driving wheel may be locked by excessive engine brake when downshift is performed rapidly. Then, a shift speed GR2d is calculated from the shift speed map for downshift shown in FIG. 6. Since a shift speed GR2d is smaller than a shift speed limiter value GR2dL when a shift speed a limiter value GR2dL is greater than a shift speed GR2d, the shift speed GR2d is selected. When the shift speed GR2d is larger than the shift speed limiter GR2dL, the shift speed limiter value GR2dL is selected. Moreover, since downshift is performed in this case, a correction line pressure is calculated from the line pressure correction map and is added to an ordinary line pressure.

Figure 11:
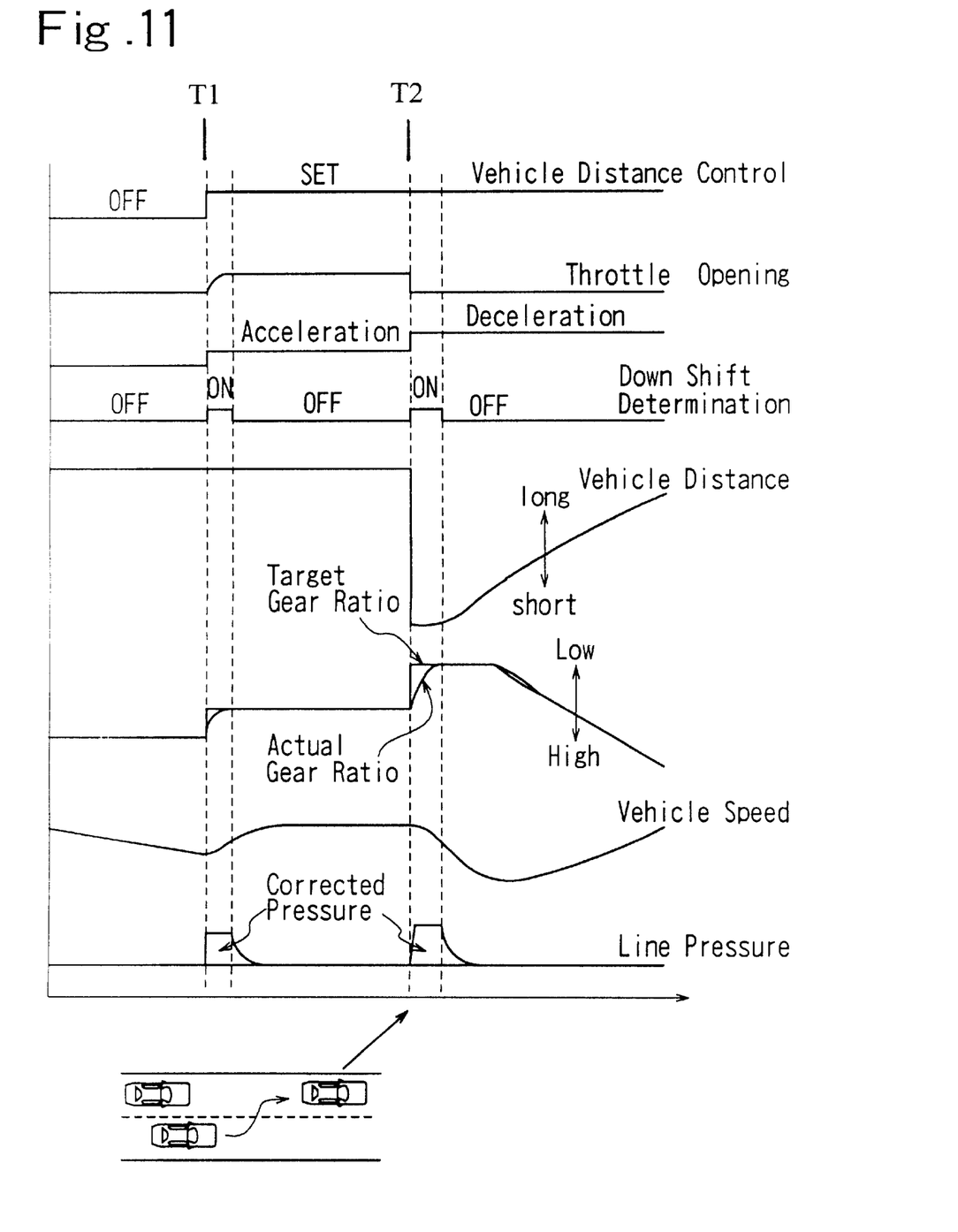
FIG. 11 is a time chart of the time when a vehicle cuts in from another lane according to an embodiment of the invention.

FIG. 11 is a time chart of the case where a vehicle cuts in between the preceding vehicle and the own vehicle when the vehicle distance control of the embodiment is performed. Before another vehicle cuts in, and where the vehicle speed is lowered, when a vehicle distance control is set at time T1, it is determined that acceleration is required, and throttle opening is increased, and at the same time a target gear ratio is set at a lower level. Then, it is determined that acceleration by downshifting is required, and a correction line pressure is added to an ordinary line pressure. Thereby, a vehicle distance is kept constant.

Next, as shown at the bottom of FIG. 11, when a vehicle running on another lane cuts in at time T2, a vehicle distance shortens rapidly. In this case, it is determined that deceleration torque by downshifting is required, and the throttle opening is closed, and simultaneously a target gear ratio is set to a lower level. Then, to execute downshift, a correction line pressure is added to an ordinary line pressure. By decelerating, therefore, a vehicle distance is controlled to maintain a proper distance again. Thus, even if a vehicle distance shortens rapidly because of a vehicle interposing from another lane, it is possible to keep a vehicle distance proper with good response by changing a target gear ratio or by increasing a shift speed.

In the shift control system of the continuously variable transmission of the embodiment, as described above, when a vehicle distance is controlled by the vehicle distance controller 121, by making a shift speed higher than a shift speed at the time when a vehicle distance is not controlled by the vehicle distance controller 121, the CVT control unit 14 can change speed with good response, and thereby a vehicle distance can be kept proper.

By setting a shift speed according to a deviation between a target gear ratio and an actual gear ratio at the time when a vehicle distance is not controlled, and by setting a constant shift speed that is higher than at least a shift speed at the time when a vehicle distance is not controlled, regardless of a deviation between a target gear ratio and an actual gear ratio, at the time when a vehicle distance is controlled, a smooth shift control can be performed. Also, when response is demanded as at the time when a vehicle distance is controlled, by always increasing a shift speed regardless of deviation between a target gear ratio and an actual gear ratio, a sufficient shift response can be ensured, and a vehicle distance can be kept proper.

When a gear ratio control for increasing a shift speed is performed, by adding a correction line pressure to an ordinary line pressure, a sufficient line pressure can be ensured. Even if a shift speed is increased, pulley ratio can be changed with good response.

Moreover, there is provided a shift speed limiter for setting an upper limit of shift speed when deceleration torque is obtained by shifting a gear ratio to a lower level at the time when a vehicle distance is controlled.

In short, when deceleration torque is obtained by shifting a gear ratio to a lower level at the time of controlling a vehicle distance, although deceleration is attempted by shifting a gear ratio to a lower level, however, a higher shift speed is selected regardless of a deviation between a target gear ratio and an actual gear ratio in the shift speed control device. In case an engine speed becomes lower than a driving wheel speed when the gear ratio is changed to a lower level rapidly, slow engine speed, i.e., engine braking, can lock the driving wheel. Therefore, by providing the shift speed limiter so that excessive engine braking is not applied, a smooth deceleration can be performed.

What is claimed is:

1. A shift control system for a continuously variable transmission which has a gear ratio control means for controlling a gear ratio of said continuously variable transmission by determining a target gear ratio from a drive point determined on the basis of at least a throttle opening and a vehicle speed, and a vehicle distance control means for maintaining a proper vehicle distance by controlling a throttle opening of an engine, wherein said gear ratio control means includes a shift speed control device for making a shift speed higher than a shift speed established when a vehicle distance is not controlled, when a vehicle distance is controlled by said vehicle distance control means.

2. A shift control system for a continuously variable transmission according to claim 1, wherein said shift speed control device is provided with a first shift speed map for setting a shift speed according to a deviation between a target gear ratio and an actual gear ratio when a vehicle distance is not controlled and a second shift speed map for setting a shift speed which is constant and higher than a shift speed at the time when a vehicle distance is not controlled, regardless of a deviation between a target gear ratio and an actual gear ratio when a vehicle distance is controlled.

3. A shift control system for a continuously variable transmission according to claim 1, wherein said shift speed control device is equipped with a line pressure-correcting device for adding a correction line pressure to a line pressure for an ordinary control when performing a gear ratio control for increasing the shift speed.

4. A shift control system for a continuously variable transmission according to claim 1, wherein said shift speed control device is equipped with a shift speed limiter for setting an upper limit of the shift speed at the time of obtaining a deceleration torque by lowering the gear ratio when the vehicle distance is controlled.

5. A shift control system for a continuously variable transmission according to any of claims 1 to 4, wherein said gear ratio control means is provided with a target shift map for a vehicle distance control for determining a target gear ratio so that the gear ratio is set higher when the vehicle distance control means controls a vehicle distance, compared to the time when the vehicle distance control means does not control a vehicle distance.

\* \* \* \* \*